(12) United States Patent
Ma et al.

(10) Patent No.: US 9,778,508 B2
(45) Date of Patent: Oct. 3, 2017

(54) LIQUID CRYSTAL DISPLAY DEVICE AND A BACKLIGHT MODULE THEREOF

(71) Applicant: Boe Technology Group Co., Ltd., Beijing (CN)

(72) Inventors: Yongda Ma, Beijing (CN); Jingxia Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 143 days.

(21) Appl. No.: 14/892,652

(22) PCT Filed: Apr. 16, 2015

(86) PCT No.: PCT/CN2015/076751
§ 371 (c)(1),
(2) Date: Nov. 20, 2015

(87) PCT Pub. No.: WO2016/110019
PCT Pub. Date: Jul. 14, 2016

(65) Prior Publication Data
US 2016/0357067 A1    Dec. 8, 2016

(30) Foreign Application Priority Data
Jan. 8, 2015   (CN) .................... 2015 2 0012961 U

(51) Int. Cl.
*G02F 1/1335*   (2006.01)
(52) U.S. Cl.
CPC .. *G02F 1/133608* (2013.01); *G02F 1/133603* (2013.01); *G02F 1/133604* (2013.01); *G02F 2001/133628* (2013.01)
(58) Field of Classification Search
CPC ......... G02F 1/133608; G02F 1/133603; G02F 1/133604; G02F 2001/133628
See application file for complete search history.

(56) References Cited

U.S. PATENT DOCUMENTS

2007/0211205 A1*  9/2007  Shibata ............. G02F 1/133603
                                                                    349/161

FOREIGN PATENT DOCUMENTS

| CN | 1632663   | 6/2005 |
|----|-----------|--------|
| CN | 101044427 | 9/2007 |

(Continued)

OTHER PUBLICATIONS

International Search Report and Written Opinion from PCT/CN15/76751 dated Sep. 24, 2015.

*Primary Examiner* — David V Bruce
(74) *Attorney, Agent, or Firm* — Calfee, Halter & Griswold LLP

(57) ABSTRACT

The present application discloses a liquid crystal display device and a backlight module thereof. The backlight module comprises a backboard, a separating plate, and a light source component; wherein the backboard has a base plate and a plurality of side plates, and the backboard is an injection molding board; the separating plate is mounted in an accommodating groove, a heat dissipation chamber is formed between the separating plate and the base plate, in the heat dissipation chamber, the backboard is provided with convection holes; the light source component comprises a plurality of lamp substrates and a plurality of LED lamps mounted on the lamp substrates, the lamp substrates are located within the heat dissipation chamber, and the separating plate is provided with transparent holes enabling light emitted by each of the LED lamps to penetrate the separating plate in a thickness direction of the separating plate.

16 Claims, 2 Drawing Sheets

(56) References Cited

FOREIGN PATENT DOCUMENTS

| | | |
|---|---|---|
| CN | 102192438 | 9/2011 |
| CN | 103578360 | 2/2014 |
| CN | 103648258 | 3/2014 |
| JP | 2013-118117 | 6/2013 |

* cited by examiner

LIQUID CRYSTAL DISPLAY DEVICE AND A BACKLIGHT MODULE THEREOF

The present application is the U.S. national phase entry of PCT/CN2015/076751, with an international filing date of Apr. 16, 2015, which claims the benefit of Chinese Patent Application No. 201520012961.4, filed on Jan. 8, 2015, the entire disclosures of which are incorporated herein by reference.

FIELD OF THE INVENTION

The present application relates to the field of display technology, particularly to a liquid crystal display device and a backlight module thereof.

BACKGROUND OF THE INVENTION

In the field of display technology, the backlight module of the liquid crystal display device of high brightness usually adopts a direct-type backlight module.

In the direct-type backlight module in the prior art, the heat dissipation of the lamp usually adopts metal lamp substrates in contact with the metal backboard, thereby enabling heat exchange to be performed between the metal backboard and the metal lamp substrates, taking the heat on the metal lamp substrate away through the metal backboard, then, the metal backboard dissipates the heat to the external environment of the backboard, so as to realize heat dissipation of the light source component.

However, the metal backboard has a relatively large weight, which not only increases the manufacturing cost of the product, but also is unfavorable for delivery and transport in production of the product.

SUMMARY OF THE INVENTION

The present application provides a liquid crystal display device and a backlight module thereof, the backboard in the backlight module is an injection moulding backboard, the backlight module has a relatively small weight, which reduces the manufacturing cost of the backlight module and is convenient for transport and transport of the product.

In order to achieve the above purposes, the present application provides the following technical solutions:

A backlight module comprises a backboard, a separating plate, and a light source component; wherein:

the backboard has a base plate and a plurality of side plates so as to form an accommodating groove, and the backboard is an injection moulding board;

the separating plate is mounted in the accommodating groove, a heat dissipation chamber is formed between the separating plate and the base plate, in the heat dissipation chamber, the backboard is provided with convection holes communicating the external environment with the heat dissipation chamber, so as to form a gas convection channel with chimney effect in the heat dissipation chamber;

the light source component comprises a plurality of lamp substrates and a plurality of LED lamps mounted on the lamp substrates, the lamp substrates are located within the heat dissipation chamber, each LED lamp is located at a side of the lamp substrate away from the base plate, and the separating plate is provided with transparent holes enabling light emitted by each of the LED lamps to penetrate the separating plate in a thickness direction of the separating plate.

In the above backlight module, the backboard is an injection moulding backboard, which has a relatively small weight. The light emitted by the LED lamps in the light source component is emitted into one side of the separating plate away from the base plate through the transparent holes arranged on the separating plate, to provide light source for the liquid crystal display device. The heat generated by the LED lamps is dissipated into the heat dissipation chamber formed between the base plate in the backboard and the separating plate through the lamp substrates. Since the base plate of the backboard is provided with convection holes communicating with the heat dissipation chamber, and a gas convection channel with chimney effect is formed, the cold air can enter into the heat dissipation chamber from one end of the gas convection channel, meanwhile, the hot air can be dissipated out of the heat dissipation chamber from the other end of the gas convection channel, thereby taking away the heat within the heat dissipation chamber so as to realize heat dissipation of the light source component.

Therefore, the heat dissipation of the light source component in the backlight module is realized through the heat dissipation chamber between the backboard and the separating plate as well as the formed gas convection channel. The backboard in the above backlight module is an injection moulding backboard, and has a relatively small weight, which reduces the manufacturing cost of the backlight module and is convenient for transport and transport of the product.

Preferably, a surface of a side of the base plate facing towards the separating plate is provided with a plurality of lamp positioning base stations, the lamp substrates are fixed on the lamp positioning base stations, such that air gaps are formed between the lamp substrates and the base plate, the air gaps cooperate with the convection holes arranged on the backboard to form the gas convection channel.

Preferably, surfaces of sides of the lamp substrates away from the base plate and a surface of a side of the separating plate facing towards the base plate are in seal cooperation.

Preferably, the surfaces of the sides of the lamp substrates away from the base plate and the surface of the side of the separating plate facing towards the base plate are in seal cooperation through bonding.

Preferably, each of the LED lamps penetrates the separating plate through the transparent hole in the thickness direction of the separating plate, so as to extend into a space at the side of the separating plate away from the base plate.

Preferably, the side of the separating plate away from the base plate is a reflective side.

Preferably, the separating plate comprises a separating plate body and a reflective layer, the reflective layer is located at a side of the separating plate body away from the base plate, a side of the reflective layer away from the separating plate body forms the reflective side.

Preferably, the separating plate is a separating plate made from a metal aluminum material.

The present application further provides a liquid crystal display device comprising any of the backlight modules provided in the above technical solutions.

DETAILED DESCRIPTION OF THE INVENTION

Next, the technical solutions in the embodiments of the present application will be described clearly and completely in combination with the drawings in the embodiments of the present application. Apparently, the embodiments described are only a part of rather than all of the embodiments of the present application. Based on the embodiments in the present application, all other embodiments obtained by the ordinary skilled person in the art on the premise of not paying any creative work belong to the protection scope of the present application.

Figure 1:
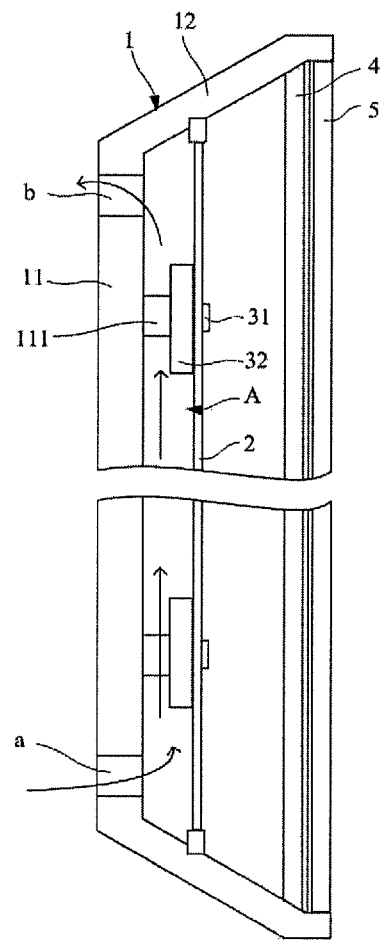
FIG. 1 is a structural schematic view of a liquid crystal display device provided in an embodiment of the present application.

Please refer to FIG. 1, FIG. 1 shows a structural schematic view of a liquid crystal display device provided in the embodiment of the present application. As shown in FIG. 1, the backlight module provided in the embodiment of the present application comprises a backboard 1, a separating plate 2, and a light source component.

The backboard 1 has a base plate 11 and a plurality of side plates 12 so as to form an accommodating groove, and the backboard 1 is an injection moulding backboard.

Figure 2:
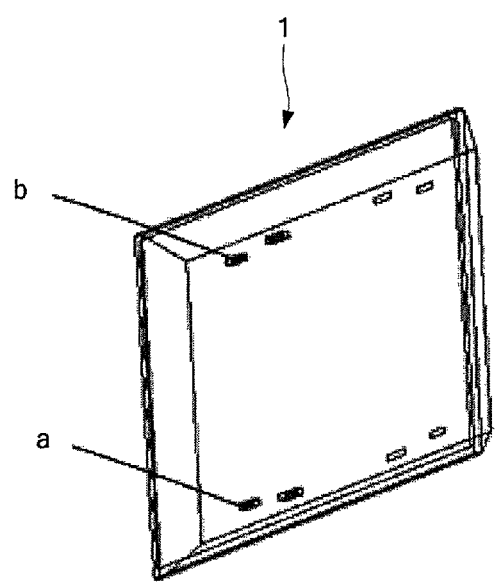
FIG. 2 is a structural schematic view of a backboard in a backlight module provided in an embodiment of the present application.

The separating plate 2 is mounted in the accommodating groove, a heat dissipation chamber A is formed between the separating plate 2 and the base plate 11. In the heat dissipation chamber A, the backboard 1 is provided with convection holes communicating the external environment with the heat dissipation chamber A, so as to form a gas convection channel with chimney effect in the heat dissipation chamber A, such as convection hole a and convection hole b as shown in FIG. 1 and FIG. 2. Preferably, the convection holes are arranged on the base plate 11 of the backboard 1, it can be seen from FIG. 2 that there may be one or more of convection holes a and b.

The light source component comprises a plurality of lamp substrates 32 and a plurality of LED lamps 31 mounted on the lamp substrates 32. The lamp substrates 32 are located within the heat dissipation chamber A, each LED lamp 31 is located at a side of the lamp substrate 32 away from the base plate 11, and the separating plate 2 is provided with transparent holes enabling light emitted by each of the LED lamps 31 to penetrate the separating plate 2 in a thickness direction of the separating plate 2.

As shown in FIG. 1, the separating plate 2 provided in the accommodating groove formed by the backboard 1 of the backlight module separates the space between the base plate 11 of the backboard 1 in the backlight module and the optical film material 4 into two parts, one part is the heat dissipation chamber A between the separating plate 2 and the base plate 11, the other part is an optical chamber between the separating plate 2 and the optical film material 4. In the above backlight module, the backboard 1 is an injection moulding backboard, and has a relatively small weight. The light emitted by the LED lamps 31 in the light source component is emitted into one side of the separating plate 2 away from the base plate 11 through transparent holes arranged on the separating plate 2, so as to provide light source for the display panel 5 on the liquid crystal display device. The heat generated by the LED lamps 31 is dissipated into the heat dissipation chamber A formed between the base plate 11 in the backboard 1 and the separating plate 2 through the lamp substrates 32. The convection holes provided on the backboard 1 communicate with the heat dissipation chamber A, and a gas convection channel with chimney effect is formed. When the display device is placed in a direction as shown in FIG. 1, the cold air can enter into the heat dissipation chamber A from one end, i.e., convection hole a of the gas convection channel. The cold air, after entering into the heat dissipation chamber A, performs heat exchange with the lamp substrates 32 to form hot air. The hot air can be dissipated out of the heat dissipation chamber A from the other end, i.e., convection hole b, of the gas convection channel, thereby taking away the heat in the heat dissipation chamber A, so as to realize heat dissipation of the light source component. The arrows in FIG. 1 exemplarily show the air circulation directions.

Therefore, the heat dissipation of the light source component in the above backlight module is realized through the heat dissipation chamber A between the backboard 1 and the separating plate 2 as well as the formed gas convection channel. The backboard 1 in the above backlight module is an injection moulding backboard, and has a relatively small weight, which reduces the manufacturing cost of the backlight module and is convenient for transport and transport of the product.

Please refer to FIG. 1 further, in order to ensure the gas convection chamber between the base plate 11 in the backboard 1 and the separating plate 2 to be unobstructed enough, in a preferred embodiment, a surface of a side of the base plate 11 facing towards the separating plate 2 is provided with a plurality of lamp positioning base stations 111, the lamp substrates 32 are fixed on the lamp positioning base stations 111, such that air gaps are formed between the lamp substrates 32 and the base plate 11. The air gaps cooperate with the convection holes arranged on the backboard 1 to form the gas convection channel. The arrangement of the lamp positioning base stations 111 can ensure the spacing between the lamp substrates 32 and the base plate 11 in the backboard 1, thereby ensuring the gas convection channel between the base plate 11 in the backboard 1 and the separating plate 2 to be unobstructed enough.

Please refer to FIG. 1 further, in order to prevent impurities such as external dust from entering into the optical chamber at one side of the separating plate 2 away from the base plate 11, surfaces of sides of the lamp substrates 32 away from the base plate 11 and a surface of a side of the separating plate 2 facing towards the base plate 11 may be in seal cooperation.

Specifically, the surfaces of the sides of the lamp substrates 32 away from the base plate 11 and the surface of the side of the separating plate 2 facing towards the base plate 11 are in seal cooperation through bonding. The bonding between the lamp substrates 32 and the separating plate 2 can be realized through double-faced adhesive tape or adhesive.

More specifically, please refer to FIG. 1 further, each of the LED lamps 31 penetrates the separating plate 2 through the transparent hole in the thickness direction of the separating plate 2, so as to extend into a space at the side of the separating plate 2 away from the base plate 11, i.e., extending into the optical chamber. In this way, the angle when the light emitted by the LED lamps 31 into the optical chamber can be increased, and the utilization rate of the light emitted by the LED lamps 31 can be increased.

In a preferred embodiment, the side of the above separating plate 2 away from the base plate 11 is a reflective side. Consequently, the separating plate 2 can play the function of a reflective sheet, a separate reflective structure does not have to be arranged for the backlight module.

Specifically, the separating plate 2 comprises a separating plate body and a reflective layer, the reflective layer is located at a side of the separating plate body away from the base plate 11, a side of the reflective layer away from the separating plate body forms the reflective side.

A side of the separating plate 2 away from the base plate being a reflective side can also be specifically realized as: the separating plate 2 is a separating plate made from a metal aluminum material.

In addition, the embodiment of the present application further provides a liquid crystal display device comprising any of the backlight modules provided in the above embodiments. Since the above backlight module has a relatively small weight, the liquid crystal display device using the above backlight module also has a relatively small weight.

Apparently, the skilled person in the art can make various amendments and variations to the embodiments of the present application without departing from the spirit and scope of the present application. In this way, provided that these modifications and variations of the present application belong to the scopes of the claims of the present application and the equivalent technologies thereof, the present application also intends to cover these modifications and variations.

The invention claimed is:

1. A backlight module, comprising a backboard, a separating plate, and a light source component wherein,
    the backboard has a base plate and a plurality of side plates so as to form an accommodating groove, and the backboard is an injection moulding board;
    the separating plate is mounted in the accommodating groove, a heat dissipation chamber is formed between the separating plate and the base plate, in the heat dissipation chamber, the backboard is provided with convection holes communicating the external environment with the heat dissipation chamber, so as to form a gas convection channel with chimney effect in the heat dissipation chamber; and
    the light source component comprises a plurality of lamp substrates and a plurality of LED lamps mounted on the lamp substrates, the lamp substrates are located within the heat dissipation chamber, each LED lamp is located at a side of the lamp substrate away from the base plate, and the separating plate is provided with transparent holes enabling light emitted by each of the LED lamps to penetrate the separating plate in a thickness direction of the separating plate.

2. The backlight module according to claim 1, wherein a surface of a side of the base plate facing towards the separating plate is provided with a plurality of lamp positioning base stations, the lamp substrates are fixed on the lamp positioning base stations, such that air gaps are formed between the lamp substrates and the base plate, the air gaps cooperate with the convection holes arranged on the backboard to form the gas convection channel.

3. The backlight module according to claim 2, wherein the surfaces of sides of the lamp substrates away from the base plate and a surface of a side of the separating plate facing towards the base plate are in seal cooperation.

4. The backlight module according to claim 3, wherein the surfaces of the sides of the lamp substrates away from the base plate and the surface of the side of the separating plate facing towards the base plate are in seal cooperation through bonding.

5. The backlight module according to claim 3, wherein each of the LED lamps penetrates the separating plate through the transparent hole in the thickness direction of the separating plate, so as to extend into a space at the side of the separating plate away from the base plate.

6. The backlight module according to claim 1, wherein the side of the separating plate away from the base plate is a reflective side.

7. The backlight module according to claim 6, wherein the separating plate comprises a separating plate body and a reflective layer, the reflective layer is located at a side of the separating plate body away from the base plate, a side of the reflective layer away from the separating plate body forms the reflective side.

8. The backlight module according to claim 6, wherein the separating plate comprising an aluminum material.

9. A liquid crystal display device, comprising a backlight module comprising
    a backboard, a separating plate, and a light source component;
    wherein the backboard has a base plate and a plurality of side plates so as to form an accommodating groove, and the backboard is an injection moulding board;
    wherein the separating plate is mounted in the accommodating groove, a heat dissipation chamber is formed between the separating plate and the base plate, in the heat dissipation chamber, the backboard is provided with convection holes communicating the external environment with the heat dissipation chamber, so as to form a gas convection channel with chimney effect in the heat dissipation chamber; and
    wherein the light source component comprises a plurality of lamp substrates and a plurality of LED lamps mounted on the lamp substrates, the lamp substrates are located within the heat dissipation chamber, each LED lamp is located at a side of the lamp substrate away from the base plate, and the separating plate is provided with transparent holes enabling light emitted by each of the LED lamps to penetrate the separating plate in a thickness direction of the separating plate.

10. The liquid crystal display device according to claim 9, wherein a surface of a side of the base plate facing towards the separating plate is provided with a plurality of lamp positioning base stations, the lamp substrates are fixed on the lamp positioning base stations, such that air gaps are formed between the lamp substrates and the base plate, the air gaps cooperate with the convection holes arranged on the backboard to form the gas convection channel.

11. The liquid crystal display device according to claim 10, wherein surfaces of sides of the lamp substrates away from the base plate and a surface of a side of the separating plate facing towards the base plate are in seal cooperation.

12. The liquid crystal display device according to claim 11, wherein the surfaces of the sides of the lamp substrates away from the base plate and the surface of the side of the separating plate facing towards the base plate are in seal cooperation through bonding.

13. The liquid crystal display device according to claim 11, wherein each of the LED lamps penetrates the separating plate through the transparent hole in the thickness direction of the separating plate, so as to extend into a space at the side of the separating plate away from the base plate.

14. The liquid crystal display device according to claim 9, wherein the side of the separating plate away from the base plate is a reflective side.

15. The liquid crystal display device according to claim 14, wherein the separating plate comprises a separating plate body and a reflective layer, the reflective layer is located at a side of the separating plate body away from the base plate, a side of the reflective layer away from the separating plate body forms the reflective side.

16. The liquid crystal display device according to claim 14, wherein the separating plate comprising an aluminum material.

\* \* \* \* \*